Patented Feb. 9, 1943

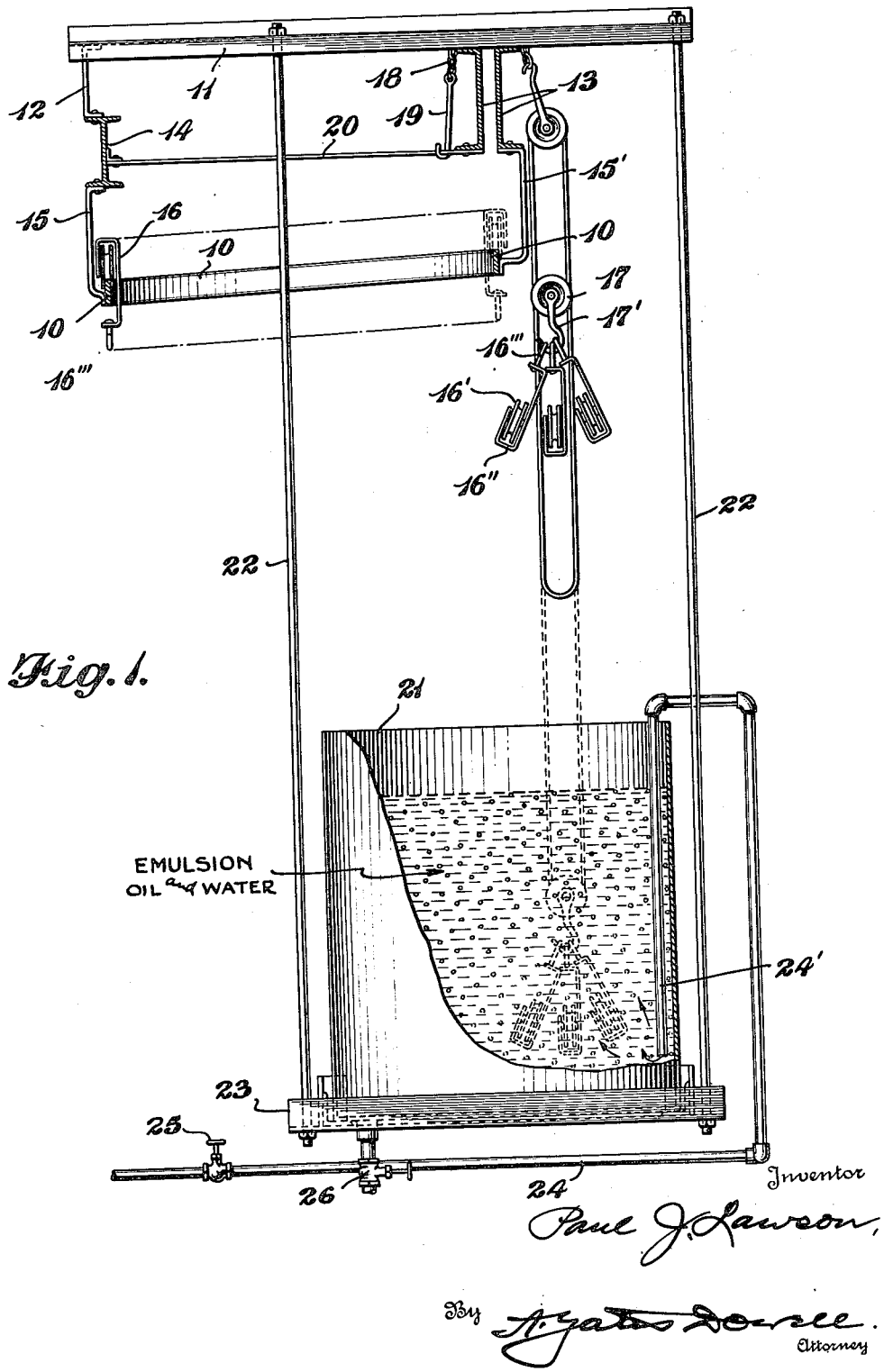

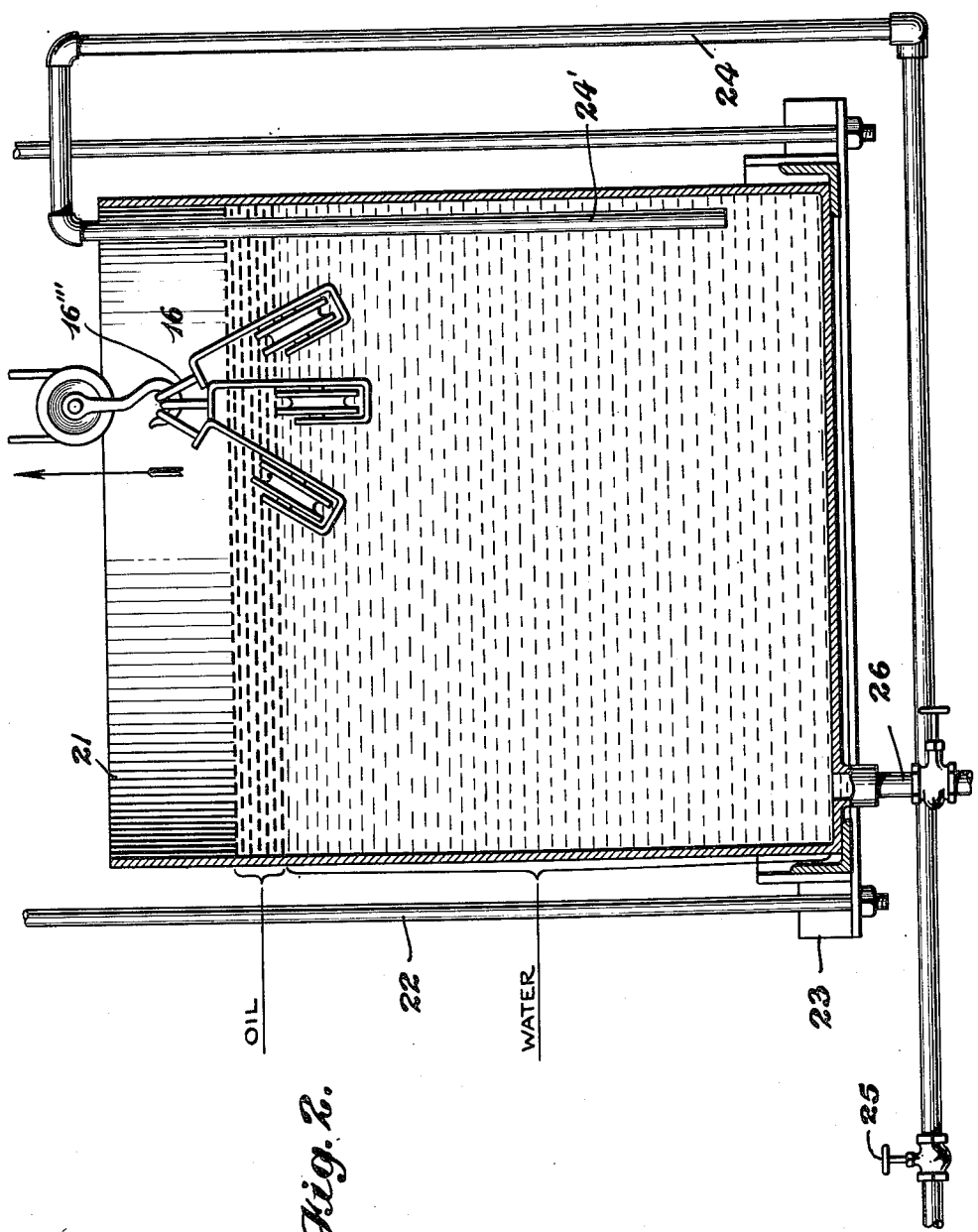

2,310,585

UNITED STATES PATENT OFFICE 2,310,585

METHOD OF TREATING MEAT TROLLEYS

Paul J. Lawson, Columbus, Ohio

Application January 2, 1941, Serial No. 372,930

6 Claims. (Cl. 184—1)

This invention relates to a method of treating meat trolleys and like parts used in carrying carcasses and meats or meat products from place to place in packing houses, slaughter houses and other establishments.

An object of the invention is to provide a method of and means for cleaning meat trolleys and analogous parts in a more thorough and sanitary manner and with less manual handling than has heretofore been possible with prior known methods. More specifically, the invention provides for the dipping, cleaning, coating and lubricating of the meat trolleys in a single bath and with a minimum amount of manual handling and labor.

The foregoing and other objects and advantages of the invention will become apparent in view of the following description taken in conjunction with the drawings, wherein:

Fig. 1 is a view in sectional elevation of a type of apparatus which may be used for carrying out the method, the bath in which the trolleys are immersed being in an emulsifield and agitated state to effect cleaning and sterilization of the trolleys; and Fig. 2 is an enlarged transverse section of the bath at the completion of the cleaning operation.

Generally stated, the method consists in providing a bath made up of a cleaning fluid and a coating and lubricating fluid having different specific gravities, agitating the bath to mix or emulsify the fluids, and immersing the trolleys in the bath until they are cleaned and sterilized, then stopping agitation and permitting the cleaning and lubricating fluids to separate with the lubricant forming a layer at the top of the bath, and finally removing the trolleys from the bath upwardly through the coating and lubricating fluid to thereby clean and sterilize the trolleys and then coat and lubricate the same preparatory to further use. The bath preferably consists of a mixture of oil and water which may be in the proportions of approximately 30 parts of water to 1 part of oil. The bath is heated to a sterilizing or scalding temperature when the trolleys are immersed therein.

Referring to the drawings in detail, a track is indicated at 10 and is supported from suitable overhead framework 11 by means such as the hanger brackets 12, beams 13 and 14 and hanger brackets 15 and 15'. The carcasses or other meat products are carried around on the track 10 by meat trolleys 16, which may be of similar construction, each comprising a grooved track wheel 16', bracket 16'' and swivel hook 16'''.

The trolleys may be readily removed from the track 10 by any suitable means, such as block and tackle 17 having a supporting or carrying hook 17'. As herein illustrated, the block and tackle is hung from the overhead channel beams 13 by means of chain 18 which is thrown over the said beams and is provided with a hook 19 engaging cross member 20.

A tank 21 is removably suspended from the overhead support 11 by means of rods 22 and base 23. In this tank is a bath containing a cleaning fluid and a coating and lubricating fluid such as oil and water in the proportions of say 192 gallons of water to 5 gallons of meat packer's oil. A pipe line 24 controlled by a valve 25 leads from a suitable source of supply to the tank 21 and is provided with a nozzle or discharge section 24' which extends downwardly to a point adjacent the bottom of the bath; and steam is introduced into the tank by means of this pipe line. A suitable drain 26 is provided for the tank 21.

The system operates as follows:

The trolleys 16 are hung in series on the track 10 and propelled around the track with the carcasses hung therefrom. When the latter are removed, the trolleys are sterilized, coated and lubricated by loading the hook 17' with trolleys and lowering them into the tank 21. Preparatory to lowering the trolleys into the tank, valve 25 is opened to allow steam to enter the tank, heating and agitating the water and oil and emulsifying and mixing the latter. The trolleys are permitted to remain in the bath for approximately 2 minutes, after which the steam is turned off and the oil is allowed to separate from the water and come to the top of the bath. The trolleys are then lifted from the tank upwardly through the layer of oil, which completely coats and lubricates the trolleys. The latter are then put back on the track ready for use. Whenever desired, the tank may be emptied and replaced by a reconditioned or fresh bath. It is desirable to raise the trolleys slowly through the layer of oil to ensure effective oiling of the trolleys.

The method has demonstrated through practical service that it is highly efficient, sanitary and results in a material saving in time and labor.

It will be understood that the steps of the method, the bath, and apparatus may be varied within limits to meet conditions within the scope of the invention as defined by the appended claims.

What is claimed is:

1. The method of cleaning and coating meat trolleys and the like which consists in immersing the trolleys in a bath containing a cleaning fluid non-miscible with oil and coating fluid of lower specific gravity, subsequently permitting the coating fluid to form in a layer on top of the bath, and thereafter raising the trolleys through the coating fluid after the cleaning operation.

2. The method of cleaning and coating meat trolleys and the like which consists in immersing the trolleys in a heated emulsion or mixture of oil and a cleaning fluid non-miscible with oil, subsequently permitting the bath to settle with the oil forming a layer on top of the bath, and then withdrawing the trolleys from the bath through the oil to lubricate and form a coating of oil on the trolleys.

3. The method of cleaning and coating meat trolleys and the like which consists in immersing the trolleys in a bath containing oil or like coating fluid and a cleaning fluid non-miscible with oil, agitating the bath to emulsify the fluid and effect cleaning of the trolleys, subsequently permitting the bath to settle with the oil on top of the bath, and then withdrawing the trolleys from the bath through the oil to form a coating of oil on the trolleys and lubricate the same.

4. The method of cleaning and coating meat trolleys and the like which consists in immersing the trolleys in a bath of oil and water, introducing steam into the bath to heat and agitate the bath and effect cleaning of the trolleys, subsequently permitting the bath to settle with the oil forming a layer on top of the water, and then withdrawing the trolleys from the bath through the layer of oil to form a coating on the trolleys and lubricate the same.

5. The method of cleaning and coating meat trolleys which consists in lowering the trolleys into a bath containing oil and water and injecting hot steam into the bath to heat and agitate the latter and effect cleaning of the trolleys, shutting the steam off from the bath and subsequently permitting the bath to settle with the oil forming in a layer on top of the bath, and then withdrawing the trolleys from the bath through the layer of oil to form a coating of oil on the trolleys and lubricate the same.

6. A method of cleaning and coating meat trolleys used in supporting and conveying meats comprising providing a bath of a cleaning fluid non-miscible with oil and a lubricant, agitating said bath such agitation including the injection of steam thereinto, lowering the trolleys into said bath and allowing them to remain long enough to be cleaned, discontinuing the agitation allowing the solution to become quiescent in order that the lubricant may accumulate on the surface thereof, and subsequently withdrawing said trolleys through said surface of lubricant thereby depositing a coating of oil on the surface of the same.

PAUL J. LAWSON.